United States Patent
Schmall et al.

(10) Patent No.: US 7,756,672 B2
(45) Date of Patent: Jul. 13, 2010

(54) METHOD FOR SETTING A PREDETERMINED DISTANCE BETWEEN A MACHINE TOOL AND AN ELECTRICALLY CONDUCTIVE WORKPIECE

(75) Inventors: Karl Heinz Schmall, Baden-Baden (DE); Robert Heck, Baden-Baden (DE)

(73) Assignee: IHT Automation GmbH & Co. KG, Baden-Baden (DE)

( * ) Notice: Subject to any disclaimer, the term of this patent is extended or adjusted under 35 U.S.C. 154(b) by 638 days.

(21) Appl. No.: 11/660,830

(22) PCT Filed: Jul. 5, 2005

(86) PCT No.: PCT/EP2005/007206
§ 371 (c)(1),
(2), (4) Date: Feb. 22, 2007

(87) PCT Pub. No.: WO2006/024338
PCT Pub. Date: Mar. 9, 2006

(65) Prior Publication Data
US 2008/0040940 A1 Feb. 21, 2008

(30) Foreign Application Priority Data
Aug. 30, 2004 (DE) .................. 10 2004 042 135

(51) Int. Cl.
*G06F 15/00* (2006.01)
*G05B 19/00* (2006.01)
(52) U.S. Cl. ...................... 702/158; 318/573
(58) Field of Classification Search ............. 702/158; 318/573
See application file for complete search history.

(56) References Cited

U.S. PATENT DOCUMENTS

| 4,831,316 A | * | 5/1989 | Ishiguro et al. | ............. 700/254 |
| 5,222,034 A | * | 6/1993 | Shelton et al. | ............. 702/152 |
| 2003/0102294 A1 | | 6/2003 | Kinbara et al. | |

FOREIGN PATENT DOCUMENTS

DE 35 13 799 C1 4/1986

(Continued)

OTHER PUBLICATIONS

International Search Report.

*Primary Examiner*—Bryan Bui
(74) *Attorney, Agent, or Firm*—Collard & Roe, P.C.

(57) ABSTRACT

A method is for setting at least one predetermined distance between a machine tool (10) and a metallic or non-metallic electrically conductive workpiece (12) according to which a capacitive and/or inductive sensor (16) fixed to the machine tool (10) while facing the workpiece (12). The machine tool (10) is displaced with constant speed toward the workpiece (12) by means of a drive device, and a sensor signal is output at predetermined time intervals by means of a data processing unit (24). The sensor signal has a characteristic quantity that continuously changes in a non-linear manner according to the distance of the machine tool (10) from the workpiece (12). The data processing unit (24) compares each read out value of the characteristic quantity with a comparative value read out before at a predetermined number of time intervals and calculates the difference between the values that are compared with one another.

11 Claims, 3 Drawing Sheets

FOREIGN PATENT DOCUMENTS

| | | |
|---|---|---|
| DE | 42 17 292 A1 | 12/1993 |
| DE | 94 19 477.7 U1 | 3/1995 |
| DE | 42 44 834 C2 | 7/1996 |
| DE | 196 34 782 A1 | 3/1998 |
| DE | 197 27 094 A1 | 1/1999 |
| DE | 298 21 165 U1 | 4/1999 |
| DE | 100 59 232 A1 | 6/2002 |
| DE | 101 96 266 T1 | 8/2003 |
| DE | 102 02 867 A1 | 8/2003 |

* cited by examiner

METHOD FOR SETTING A PREDETERMINED DISTANCE BETWEEN A MACHINE TOOL AND AN ELECTRICALLY CONDUCTIVE WORKPIECE

CROSS REFERENCE TO RELATED APPLICATIONS

Applicants claim priority under 35 U.S.C. §119 of German Application No. 10 2004 042 135.8 filed Aug. 30, 2004. Applicants also claim priority under 35 U.S.C. §365 of PCT/EP2005/007206 filed Jul. 5, 2005. The international application under PCT article 21(2) was not published in English.

BACKGROUND OF THE INVENTION

1. Field of the Invention

The invention relates to a method for setting at least one predetermined distance between a machine tool and a metallic or non-metallic, electrically conductive workpiece.

2. The Prior Art

In the case of many machine tools, such as cutting torch tools, which serve for machining an electrically conductive, preferably metallic workpiece, it is of great importance that a predetermined distance from the workpiece is adjusted as precisely as possible, for the machining process. If, for example, the distance between a plasma cutting torch and the workpiece to be cut is not adjusted precisely, this results in increased wear of the plasma cutting torch and imprecise machining of the workpiece. A precise adjustment of the distance at which the plasma cutting torch is ignited, i.e. of the distance by which the burner is removed from the workpiece during the cutting procedure, is difficult, in particular, because it is frequently not possible to precisely determine the position of the workpiece, i.e. its height. A known method for adjusting the ignition distance consists in moving the cutting torch toward the workpiece until it touches the latter. Subsequently, it is lifted from the workpiece by means of a mechanical path measurement device, up to the ignition distance. This method has the disadvantage, however, that it is imprecise if the workpiece is a thin sheet metal. The sheet metal is deformed when the cutting torch impacts it, and the latter penetrates into the indentations in the sheet metal, so that the distance between cutting torch and the surface of the sheet metal, from which the cutting torch is lifted to the ignition distance by means of the path measurement device, is not zero but rather negative. Furthermore, the deformation of the sheet metal is damage that is frequently not desired.

Another known method provides that the torch is first moved towards the workpiece, but then is stopped at a predetermined distance above the workpiece. This distance is called the first location distance. From the first location distance, the torch is brought to the desired ignition distance by means of the path measurement device. The accuracy of the ignition distance that is set therefore depends on the accuracy with which the first location distance is set. For setting the first location distance, the torch has a ring-shaped capacitive sensor disposed around its tip, which is connected with evaluation electronics. The evaluation electronics have an electrical oscillating circuit, the capacitor of which is formed by the sensor and the workpiece. When the torch, along with the sensor fixed in place on it, approaches the workpiece, the resonance frequency of the oscillating circuit decreases. The dependence of the resonance frequency on the distance between the sensor and the workpiece can be measured during a calibration measurement, so that the resonance frequency can serve as a measure for the distance between the sensor and the workpiece. This method has the disadvantage that the curve of the resonance frequency plotted over the distance can clearly shift due to ambient influences such as humidity or ambient temperature, so that setting the first location distance is imprecise when external conditions are changeable.

SUMMARY OF THE INVENTION

It is therefore an object of the invention to further develop a method of the type stated initially, in such a manner that an adjustment of the first location distance is possible with great precision.

This object is accomplished, according to the invention, by means of a method having the characteristics of the invention. For implementing the method, a device having the characteristics of the invention is proposed. Advantageous further developments of the method are also the object of the invention, and advantageous further developments of the device are also the object of the invention.

The invention is based on the recognition that the resonance frequency of the oscillating circuit changes by a value that is approximately constant for all distances, when there is a change in the external conditions. A change in the external conditions therefore essentially only has the result that the curve of the resonance frequency plotted over the distance shifts up or down. The incline of the curve, however, remains approximately constant at every distance. The change in the resonance frequency during a predetermined time interval, which corresponds to a change in the resonance frequency during approach by a certain path, is therefore a significantly more accurate measure for the distance than the absolute value of the resonance frequency. A prerequisite for this is the non-linear progression of the resonance frequency curve, the incline of which decreases with an increasing distance. A prerequisite for usability of the method according to the invention is that the workpiece is electrically conductive, in other words at least semiconductive.

It is true that the method according to the invention is preferably carried out with a capacitative sensor, which forms the capacitor of an electrical oscillating circuit together with the workpiece. The characteristic variable that is read out is then the resonance frequency of the oscillating circuit. It is also possible, however, to use other types of capacitative or inductive sensors. The characteristic variable can be the charging and discharging time of a capacitor, the half-life of a coil current, or, if a fixed frequency is imposed from the outside, the phase between current and alternating voltage or the amplitude of the alternating current, depending on the sensor being used and the evaluation electronics being used. The only compulsory criterion is that the characteristic variable does not have a linear progression over the distance between the sensor and the workpiece.

It is practical if every value of the characteristic variable that is read out is compared with the value read out one time interval previously. It is also possible, however, to compare the value that was read out with a value that was read out n time intervals previously, where n is a natural number.

A refinement of the method provides that each value that is read out is compared with several comparison values read out previously during a number of time intervals that is predetermined, in each instance, that the differences of the read-out value and the comparison values are determined, that a limit difference that corresponds to the predetermined distance is stored in the memory of the data processing unit for every comparison value, and that the movement of the machine tool is stopped when a predetermined number of differences of the read-out value and the comparison values reaches or exceeds the assigned limit difference, in each instance, in terms of amount. Thus, for example, the read-out value can be compared with the five comparison values that were read out previously. A limit difference is stored in the memory of the data processing unit for each of the previously read-out comparison values. If all of the differences between the read-out value and the comparison values are at least as great as the limit differences assigned to the comparison values, the first location distance is considered to have been reached. An incorrect determination of the first location distance due to an individual incorrect measurement of the characteristic number is thereby precluded.

Preferably, a first and a second predetermined distance are set, and the machine tool is braked after the first predetermined distance is reached, and moved up to the second predetermined distance at a reduced speed. The second predetermined distance is then the first location distance. This advantageous further development is based on the idea that on the one hand, the first location distance should be set quickly during daily use, but that on the other hand, an overly high speed when approaching the workpiece leads to an imprecise measurement. If the approach speed can be selected to be variable, it is furthermore necessary to measure the speed of the machine tool by means of the data processing unit, and to predetermine the limit difference as a function of the speed.

It is advantageous if setting the first location distance is preceded by calibration. In this calibration, the machine tool is moved towards the workpiece until it makes contact with the latter, in order to determine the limit difference that characterizes the first location distance, and the characteristic variable is determined as a function of distance, by means of the data processing unit, and stored in memory. The progression curve of the characteristic variable over the distance can thereby be individually determined for different workpieces.

It is advantageous if the device for implementing the method according to the invention has a metallic head of the machine tool as a sensor. This sensor is electrically insulated from the other components of the machine tool, and forms the capacitor of an electrical oscillating circuit, together with the workpiece. In contrast to the ring-shaped capacitative sensor known from the state of the art, this sensor yields reliable results even at the edge of the workpiece.

BRIEF DESCRIPTION OF THE DRAWINGS

In the following, the invention will be explained in greater detail using an exemplary embodiment shown schematically in the drawing. This shows.

DETAILED DESCRIPTION OF PREFERRED EMBODIMENTS

Figure 1:
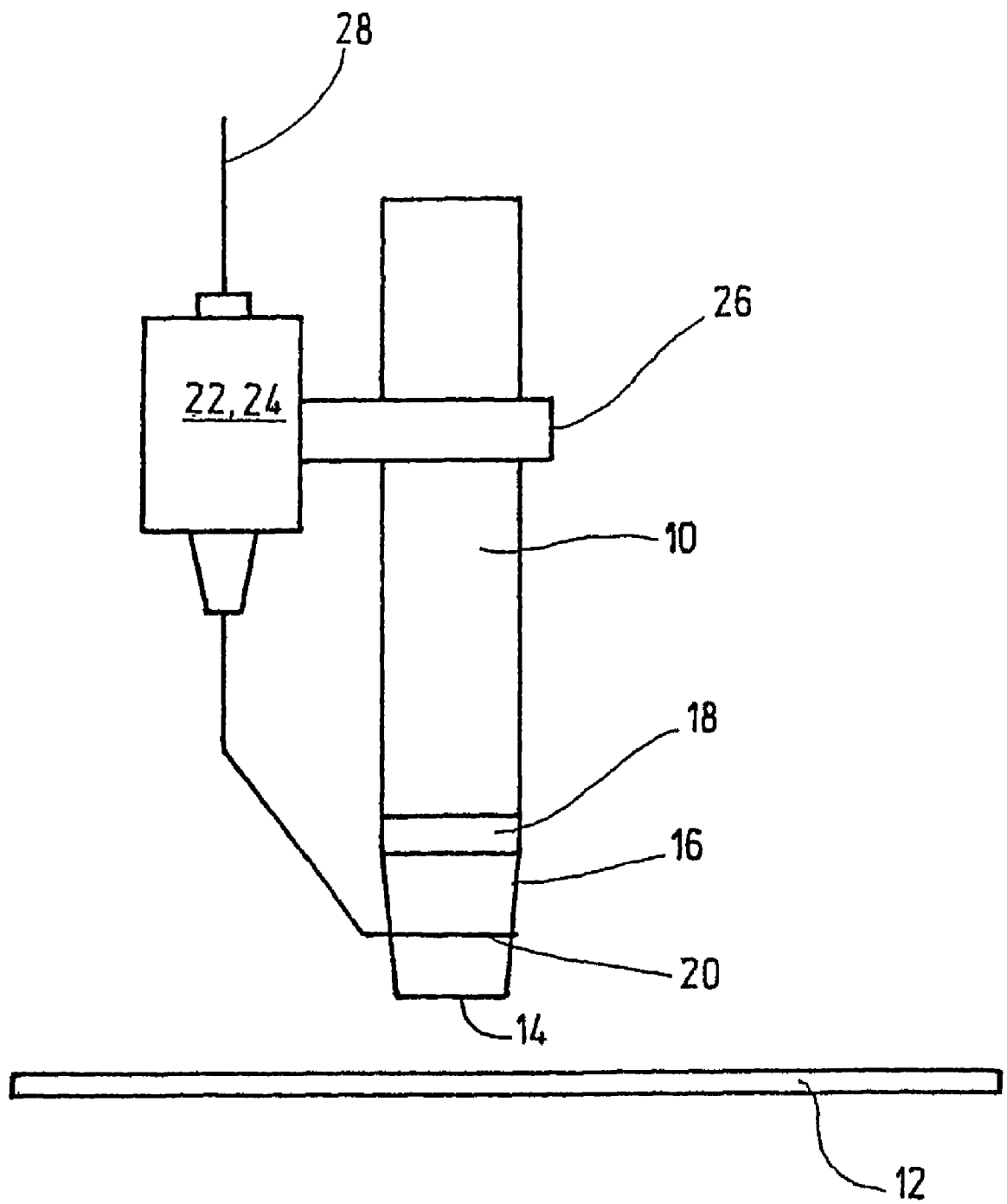
FIG. 1 a schematic representation of a cutting torch for implementing the method.

A plasma cutting torch 10 (FIG. 1) that is intended for cutting a sheet metal 12 has a nozzle cap 16 made of metal at its tip 14 facing the sheet metal 12, from which cap the plasma exits during the cutting procedure. The nozzle cap 16 is electrically insulated from the other components of the plasma cutting torch 10 by means of an insulation 18. The nozzle cap 16 serves as a capacitive sensor and forms a capacitor, together with the sheet metal 12. The nozzle cap 16 is connected with sensor electronics by way of a contact spring 20, which electronics have an electrical oscillating circuit 22 and a data processing unit 24. The sensor electronics 22, 24 are attached to the plasma cutting torch 10 by way of a holder 26, and connected with a control unit for the plasma torch 10 by way of a cable 28, which unit controls the movements of the torch in the vertical direction, by means of a drive device.

Figure 2:
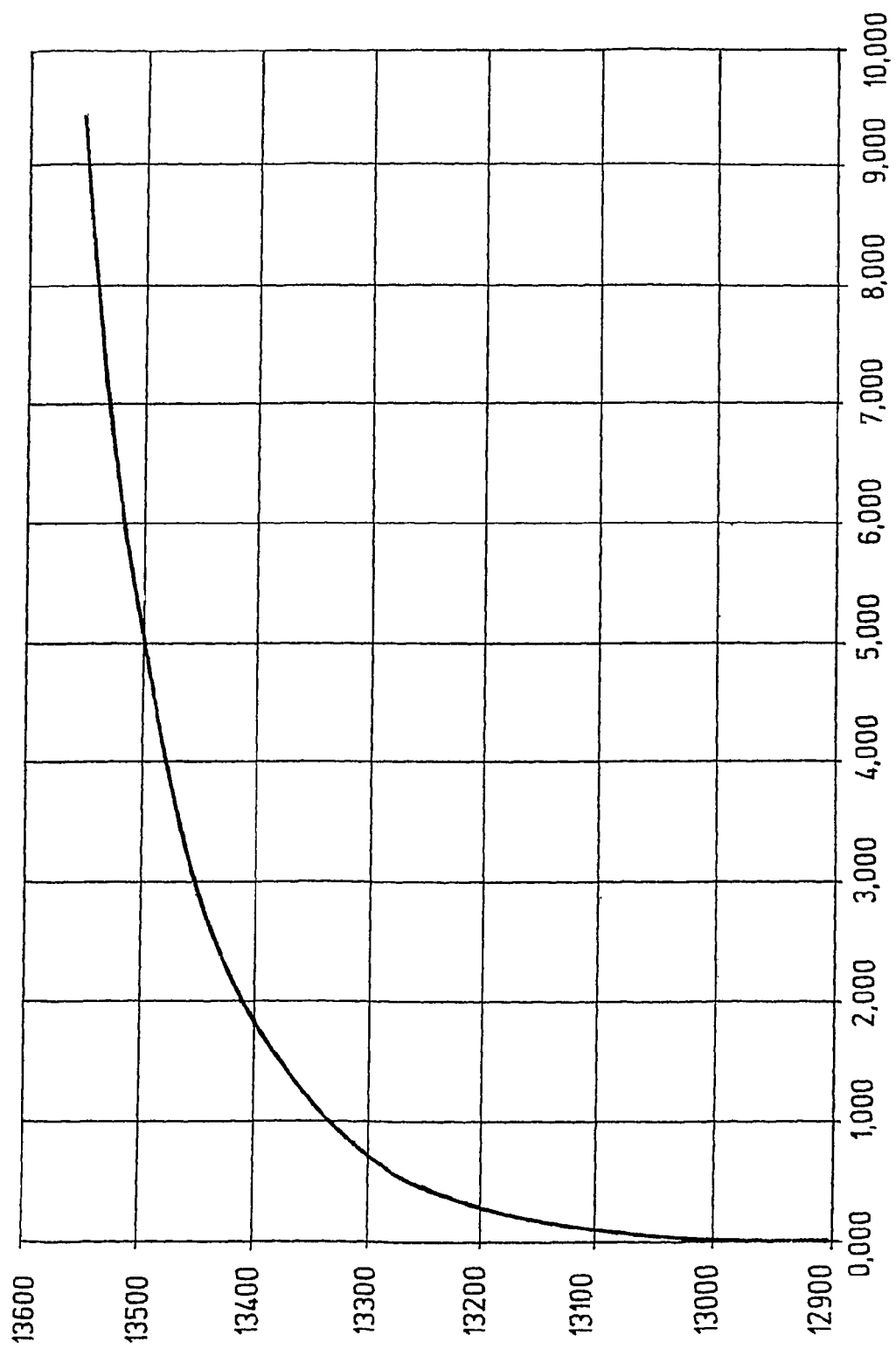
FIG. 2 a typical curve of the resonance frequency plotted over the distance, and FIG. 3 the difference in the frequencies of two consecutive measurement points of the curve from FIG. 2, plotted over the distance.
Figure 3:
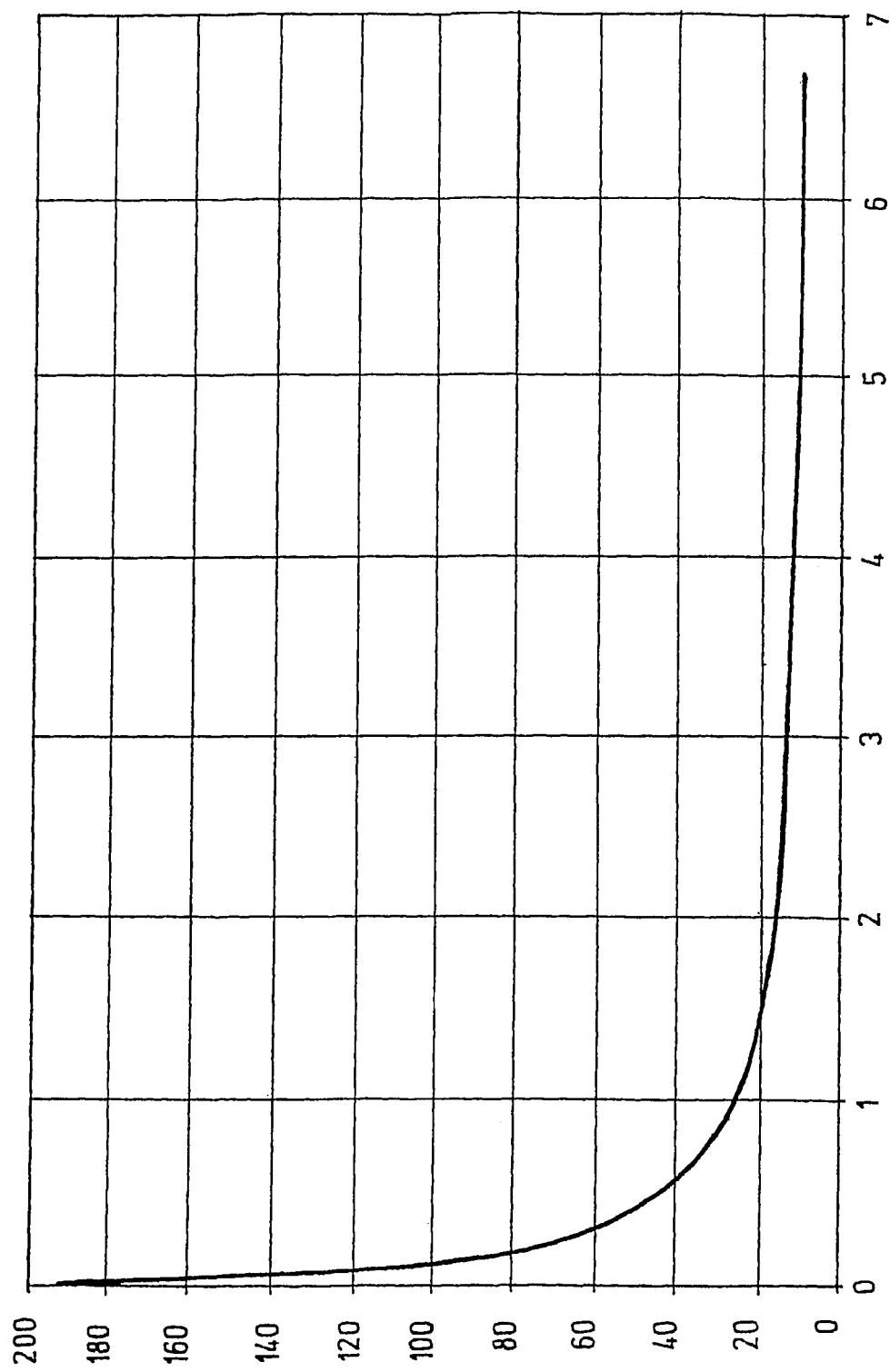

The resonance frequency of the oscillating circuit 22 is dependent on the distance between the sensor 16 and the sheet metal 12. FIG. 2 shows the progression of the resonance frequency plotted over the distance. The measurement points determined were recorded at constant distance intervals, the frequency is indicated in kilohertz, the distance in millimeters. The curve shows a non-linear progression and has an incline that becomes smaller with an increasing distance. In FIG. 3, the difference between the frequency determined at a specific measurement point, in each instance, and the frequency determined at the adjacent measurement point, measured at a greater distance, is plotted, in terms of amount, for every measurement point of the curve from FIG. 2. The closer the measurement points of FIG. 2 lie next to one another, the more accurately does the curve according to FIG. 3 correspond to the derivation of the curve according to FIG. 2.

Before the plasma cutting torch 10 is ignited, it is positioned in a defined position at a predetermined height above the surface of the sheet metal 12. For this purpose, it is first moved towards the sheet metal 12 at a constant speed. The resonance frequency of the oscillating circuit 22 is read out by means of the data processing unit 24 at constant time intervals, which typically amount to a millisecond. The data processing unit 24 compares every measured resonance frequency with the one measured one time interval previously, as a comparison value, and forms the difference between the measured resonance frequency and the comparison value for every measurement point. When the plasma cutting torch 10 reaches a certain predetermined distance from the surface of the sheet metal 12, this is correlated with the fact that the difference amount of the frequencies reaches a certain limit value. This is measured, and the advance of the plasma cutting torch 10 is stopped at this so-called first location distance from the sheet metal 12. Since external influences, such as humidity or room temperature, essentially influence only the progression of the frequency curve according to FIG. 2, but not the curve progression of its derivation according to FIG. 3, the first location distance can be set very precisely using the method described.

If the first location distance is precisely set, the distance of the plasma cutting torch 10 from the sheet metal 12, at which the former is ignited, can also be set precisely, by means of retraction by a certain path. Before the method is applied, the measurement curve according to FIG. 2 is determined by means of a calibration measurement, in which the plasma cutting torch 10 is moved towards the sheet metal 12 until it touches the latter, whereby the measurement points that yield the measurement curve shown in FIG. 2 are recorded.

In summary, the following should be stated: The invention relates to a method for setting at least one predetermined distance between a machine tool 10 and a metallic or non-metallic, electrically conductive workpiece 12, whereby a capacitative and/or inductive sensor 16 is fixed in place on the machine tool 10, facing the workpiece 12, whereby the machine tool 10 is moved towards the workpiece 12 at a constant speed, by means of a drive device, and whereby a sensor signal is read out at predetermined time intervals, by means of a data processing device 24, which signal has a characteristic variable that constantly changes, in non-linear manner, as a function of the distance of the machine tool 10 from the workpiece 12. According to the invention, it is provided that each value of the characteristic variable that is read out by means of the data processing unit 24 is compared with a comparison value read out previously during a number of time intervals that is predetermined, and the difference of the values compared with one another is calculated, that a limit difference that characterizes the predetermined distance is stored in the memory of the data processing unit 24, and that the movement of the machine tool 10 is stopped when the amount of the difference of the values compared with one another reaches or exceeds the limit difference.

The invention claimed is:

1. Method for setting at least one predetermined distance between a machine tool (10) and a metallic workpiece (12), whereby a capacitative and/or inductive sensor (16) is fixed in place on the machine tool (10), facing the workpiece (12), and
wherein a limit difference that characterizes the predetermined distance is stored in the memory of the data processing unit (24),
comprising the steps of
moving the machine tool (10) towards the workpiece (12) at a constant speed, by means of a drive device, and
reading out a sensor signal at predetermined time intervals, by means of a data processing device (24), which signal has a characteristic variable that continuously changes, in non-linear manner, as a function of the distance of the machine tool (10) from the workpiece (12),
comparing each value of the characteristic variable that is read out by means of the data processing unit (24) with a comparison value read out previously a predetermined number of time intervals, and
calculating the difference of the values compared with one another, and
stopping the movement of the machine tool (10) is when the amount of the difference of the values compared with one another reaches or exceeds the limit difference.

2. Method for setting at least one predetermined distance between a machine tool (10) and a non-metallic, electrically conductive workpiece (12), whereby a capacitative and/or inductive sensor (16) is fixed in place on the machine tool (10), facing the workpiece (12), and
wherein a limit difference that characterizes the predetermined distance is stored in the memory of the data processing unit (24),
comprising the steps of
moving the machine tool (10) towards the workpiece (12) at a constant speed, by means of a drive device, and
reading out a sensor signal at predetermined time intervals, by means of a data processing device (24), which signal has a characteristic variable that continuously changes, in non-linear manner, as a function of the distance of the machine tool (10) from the workpiece (12),
comparing each value of the characteristic variable that is read out by means of the data processing unit (24) with a comparison value read out previously a predetermined number of time intervals, and calculating the difference of the values compared with one another and, stopping the movement of the machine tool (10) when the amount of the difference of the values compared with one another reaches or exceeds the limit difference.

3. Method according to claim 1,
wherein a limit difference that characterizes the predetermined distance is stored in the memory of the data processing unit (24) for ever comparison value, and
further comprising comparing each value that is read out with several comparison values, read out previously a predetermined number of time intervals, in each instance, and
determining the differences of the read-out value and the comparison value and, stopping the movement of the machine tool (10) when a predetermined number of differences of the read-out value and the comparison values reaches or exceeds the limit difference assigned, in each instance, in terms of amount.

4. Method according to claim 1, wherein the sensor (16) is part of an electrical oscillating circuit (22) and
reading out the resonance frequency of the oscillating circuit (22) as the characteristic variable.

5. Method according to claim 1, comprising setting a first and a second predetermined distance, and
braking the machine tool (10) after the first predetermined distance is reached, and moving up to the second predetermined distance at a reduced speed.

6. Method according to claim 1, comprising measuring the speed of the machine tool (10) by means of the data processing unit (24), and predetermining the limit difference as a function of speed.

7. Method according to claim 1,
wherein setting the at least one predetermined distance is preceded by a calibration, in which the machine tool (10) is moved towards the workpiece (12) until it makes contact with the latter, in order to determine the limit difference that characterizes the predetermined distance, and
determining the characteristic variable as a function of distance, by means of the data processing unit (24), and stored in memory.

8. Device for implementing a method for setting at least one predetermined distance between a machine tool (10) and a metallic workpiece (12), comprising
a capacitative and/or inductive sensor (16) fixed in place on a machine tool (10),
a drive device for moving the machine tool (10) at a constant speed in the direction towards a workpiece (12), and
a data processing unit (24) for time-dependent evaluation of a characteristic variable determined by the sensor (16), and of the path traveled by the machine tool (10) in the direction of the workpiece.

9. Device according to claim 8,
wherein the sensor (16) is part of an electrical oscillating circuit (22).

10. Device according to claim 9,
wherein the sensor (16) forms the capacitor of the oscillating circuit (22), together with the workpiece (12).

11. Device according to claim 10,
wherein the sensor (16) is a metallic head of the machine tool (10), which is electrically insulated from the other components of the machine tool (10).

* * * * *